United States Patent [19]

Ogle

[11] Patent Number: 4,496,179
[45] Date of Patent: Jan. 29, 1985

[54] APPARATUS FOR MOVING ROLLED SHEET GOODS

[76] Inventor: Terry B. Ogle, Rte. 115, Box 408, Pigeon Forge, Tenn. 37863

[21] Appl. No.: 449,598

[22] Filed: Dec. 14, 1982

[51] Int. Cl.³ .............................................. B65G 7/12
[52] U.S. Cl. ...................................................... 294/26
[58] Field of Search ...................... 294/26, 92, 158, 27, 294/17; 16/125, 115

[56] References Cited

U.S. PATENT DOCUMENTS

| | | | |
|---|---|---|---|
| 673,830 | 5/1901 | Wade | 294/26 |
| 941,072 | 11/1909 | Huber | 294/26 |

FOREIGN PATENT DOCUMENTS

| | | | |
|---|---|---|---|
| 2333465 | 5/1977 | France | 294/26 |

*Primary Examiner*—James B. Marbert
*Attorney, Agent, or Firm*—Pitts and Brittian

[57] ABSTRACT

An apparatus (12) for moving carpet rolls is provided which enables positioning the handle (16) to be gripped by the mover at a preselected location. The apparatus handle (16) is connected to a roll engaging member (20) which in one embodiment comprises a tubular shaped device suitable for being inserted into the centrally disposed tube (14) about which the carpet is rolled. Means (26) are provided to assist in preventing the roll engaging member and the carpet roll from becoming disengaged during moving operations. The connection between the handle (16) and the roll engaging member (20) is accomplished by the length of chain (30) in one embodiment. The location at which the handle (16) and/or roll engaging member (20) are joined with the chain can be adjusted thereby adjusting the effective spacing between the handle (16) and the roll engaging member (20) for purposes of positioning the handle at a selected location during movement thereby reducing back strain.

6 Claims, 8 Drawing Figures

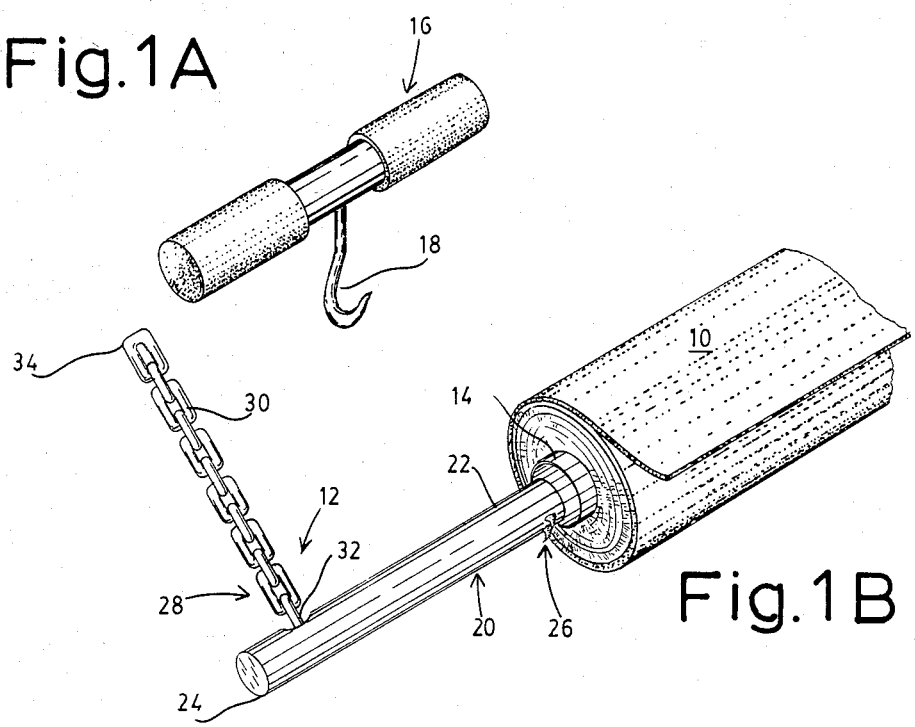
Fig.1A
Fig.1B
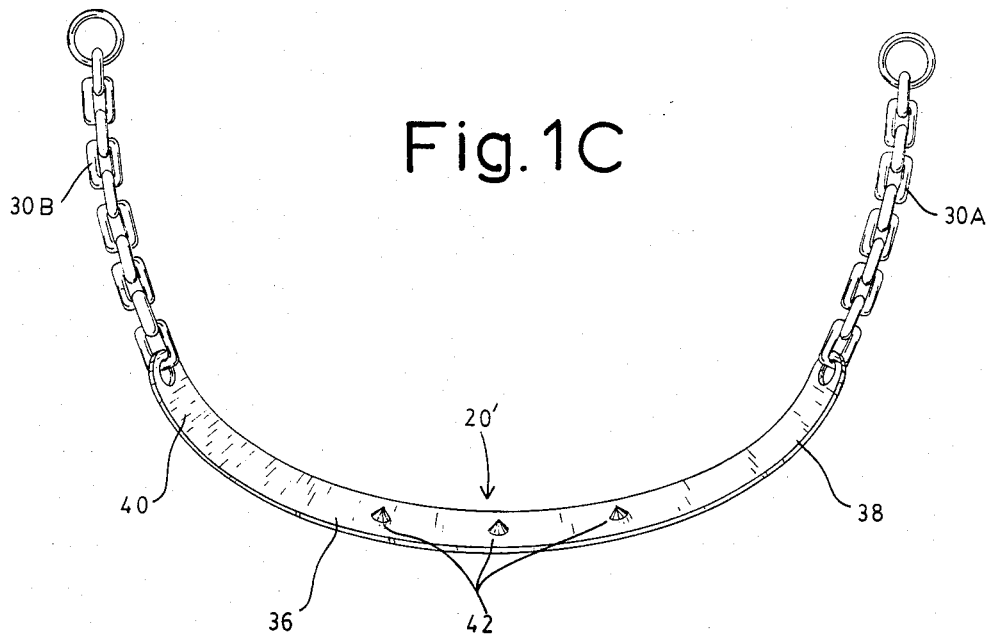
Fig.1C

APPARATUS FOR MOVING ROLLED SHEET GOODS

DESCRIPTION

1. Technical Field

This invention relates generally to an apparatus for moving rolled sheet goods such as carpet rolls and is particularly directed to a device which enables the carpet roll mover to position the handle to be gripped during moving operations at a preselected location thereby facilitating the mover's comfort during the moving operation and reducing the likelihood that the installer will develop lower back strains.

2. Background Art

Various types of devices have heretofore been known for lifting or moving awkwardly shaped parcels, tiles, blocks, etc. In general, these devices comprise a section which engages the parcel or product to be moved and a section which can be gripped by the mover. Examples of known prior devices are disclosed in U.S. Pat. Nos. 473,433; 3,006,679; and 3,708,196. These devices disclose apparatuses suitable for carrying parcels, tiles or blocks and pipes, respectively. Such devices may be used effectively and advantageously by a carrier for their intended purposes; however, devices suitable for solving the particular problems encountered in moving rolled sheet material such as carpet rolls have not been available to the carpet installer, heretofore.

Accordingly, it is an object of the present invention to provide an apparatus particularly suitable for moving rolled sheet material such as carpet rolls. Another object of the present invention is to provide an apparatus for moving rolled sheet material which enables positioning the handle to be gripped by the carpet mover at a preselected height above the supporting surface such that minimal lower back strain is produced during the moving operation. A still further object of the present invention is to provide a carpet roll moving apparatus having means for joining the apparatus and the carpet roll such that the roll and the apparatus do not become inadvertently disengaged during movement. A further object of the present invention is to provide a carpet roll moving apparatus which can be readily disengaged and removed from the carpet roll upon positioning the roll at a desired location. In accordance with another feature of the invention, the apparatus serves to grip the roll at the roll's end portion by being received within the centrally disposed tube about which the carpet is rolled and which further serves to grip the roll at a location spaced from its end portion by wrapping a portion of the apparatus around the carpet roll.

BRIEF DESCRIPTION OF THE DRAWINGS

The above mentioned and other features and objects of the present invention will be more clearly understood upon reading the detailed description of the invention together with the accompanying drawings in which:

FIGS. 1A.–C depict one embodiment of an apparatus for moving rolled sheet material such as carpet rolls constructed in accordance with various features of the present invention. These figures depict a handle, a roll engaging member designed for being received within the centrally disposed tube of the carpet roll and a roll engaging member adapted for being wrapped about the carpet roll, respectively.

DISCLOSURE OF THE INVENTION

Figures 2, 3, 3A:
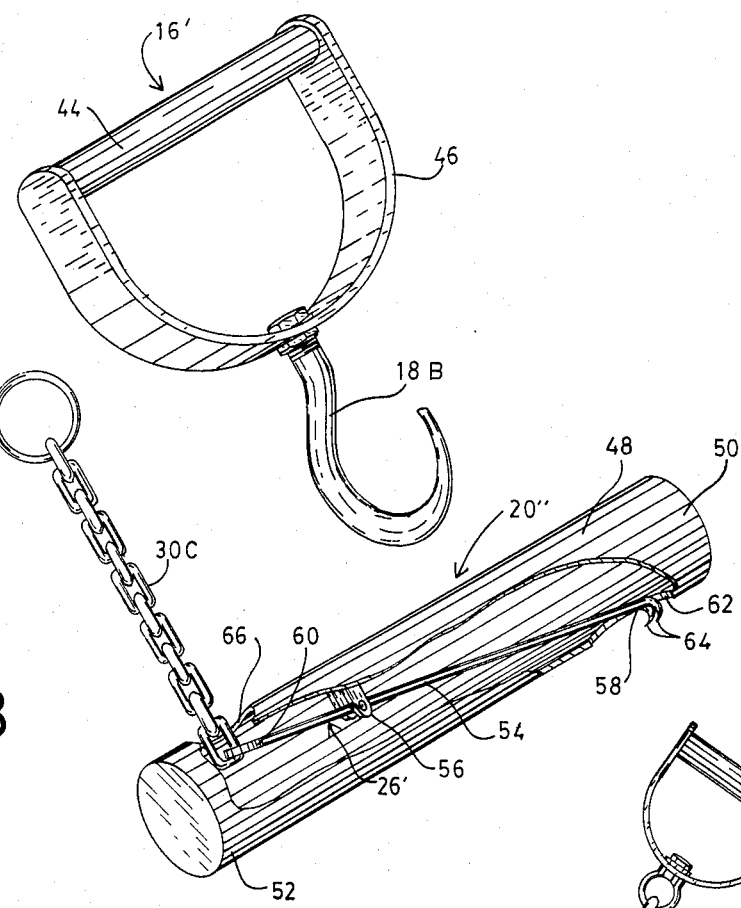
FIG. 2 illustrates an alternate embodiment of a handle suitable for being used in connection with the apparatus and which carries a hook member which can be connected with the means for joining the handle and the roll engaging member such that the height of the handle can be positioned at a selected location above the supporting surface.
FIG. 3 depicts an embodiment of the apparatus for moving carpet rolls having means to enhance securing the position of the roll engaging member within the centrally disposed cylindrical tube about which the carpet is rolled.
FIG. 3A depicts an alternate embodiment of means for joining the roll engaging member and the chain carried in this embodiment by the handle.

An apparatus for moving rolled sheet material such as carpet rolls is provided which enables positioning the handle to be gripped by the mover at a preselected location to enhance the mover's comfort and reduce the likelihood of lower back strain. The apparatus includes a handle to be gripped by the mover. This handle is connected to a roll engaging member which in one embodiment comprises an elongated tubular shaped device suitable for being inserted into the centrally disposed tube about which the carpet is rolled. This roll engaging member includes means for frictionally engaging the interior surface of the centrally disposed tube of the carpet roll to reduce the likelihood that the apparatus and the carpet roll will become inadvertently disengaged during the moving operation. The handle and the roll engaging member are joined by suitable means having an adjustable length such that the handle can be positioned at a preselected location during moving operations.

BEST MODE FOR CARRYING OUT THE INVENTION

Referring now to the figures, an apparatus for moving rolled sheet material such as a carpet roll 10 is generally indicated at 12 in FIG. 1. This carpet roll 10 has opposite end portions and comprises a cylindrical tube 14 about which the carpet is rolled. This tube is hollow and defines an interior surface, and further serves to form a core of the carpet roll. Normally, the opposite end portions of the tube extend slightly beyond the end portions of the carpet rolled about the tube. However, it is not necessary that such tube extension exists in order for the apparatus of the the invention to work properly.

The apparatus for moving a carpet roll 10 is particularly suitable for gripping and engaging the carpet roll at selected locations and is designed such that its handle 16 can be positioned at a desired height above the supporting surface to facilitate the movement of the carpet roll by the installer. More specifically, in one embodiment, this handle 16 (see FIG. 1A) comprises a T-bar member having opposite end portions which are proportioned for being gripped by the carpet roll mover. This T-bar handle member 16 further defines a mid-portion between the sections gripped by the installer which carries a hook 18 for reasons which will become more apparent hereinafter. As necessary or desired, the gripped end portions of the T-bar handle member may be provided with suitable surfacing or with handle grips which assist in preventing the installers hands from slipping during carpet roll movement.

Means generally indicated at 20 in FIG. 1B serve to engage the roll 10. More specifically, the roll engaging member 20 defines a first end portion 22 and a further end portion 24. This member 20 is proportioned for being received within a selected end portion of the cylindrical tube forming the core of the carpet roll.

End portion 22 of the roll engaging member carries means 26 for frictionally engaging the interior surface of the cylindrical tube to prevent the roll engaging member from inadvertently disengaging the cylindrical tube during moving operations. In the embodiment depicted in FIG. 1B, the frictional engaging means 26 comprises at least one, and as depicted, a plurality of protrusions which preferably are provided with a pointed end portion which embed themselves into the interior surface of the tube 14 as the opposite end portion 24 is pulled upwardly by the carpet installer during roll movement operation. The illustrated protrusions 26 are spaced annularly about the lower portion of the end portion 22 of the roll engaging member 20. It will, of course, be recognized that the protrusions 26 can assume various geometric configurations and be fabricated of various materials. For example, the protrusions may be fabricated by bending a portion of the member 20 downwardly such that the protrusions 26 are fabricated from the material of the member 20 itself.

Means generally indicated at 28 serve to join the handle and the roll engaging member. This means 28 has an adjustable length such that carpet roll mover can position the handle at a preselected distance from the roll thereby enhancing the carpet mover's comfort and ease of movement during installation operations. In the embodiment depicted in FIG. 1B, the means for joining the handle and the roll 10 comprises a length of chain 30 having one end portion 32 connected to the roll engaging member 20 and a further end portion 34 which is coupled with the handle 16. In this connection, a link of the chain length is placed over the hook 18 carried by the handle 16. Thus, this hook 18 comprises a portion of the means for joining the handle and the roll engaging member. It will be recognized that the length of the means for joining the handle and the roll engaging member can be adjusted by varying the particular link of the chain 30 which is coupled with the hook 18.

An alternate embodiment of a roll engaging member is depicted at 20' in FIG. 1C. This member is particularly suitable for gripping the roll 10 at a location spaced from its end portions, which is desirable upon raising or lowering the roll as in putting it into or removing it from the back of a truck. More specifically, this member 20' comprises an elongated strap suitable for being wrapped about a section of the carpet roll. This strap 36 includes a first end portion 38 and a further end portion 40. Each of these end portions of the strap are joined with an operatively associated end portion of a chain length 30A and 30B, respectively. The opposite end portions of each of these chain lengths can be placed into coupling engagement with the hook 18 carried by the handle. Thus, the strap is wrapped about the roll and the opposite end portions of the chain length 30A and 30B are connected with the handle to facilitate the movement of the roll by applying the lifting and moving forces at a location spaced from the end portions thereof. As necessary or desired, the inner surface of the strap 36 can be provided with a plurality of spaced frictional engaging means 42 to assist in preventing the roll from slipping during movement.

Figure 4:
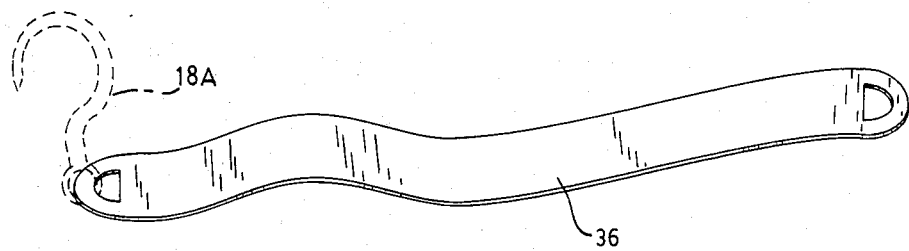
FIG. 4 illustrates an alternate embodiment of a strap suitable for being wrapped about the carpet roll for gripping the roll at a location spaced from its end portion.

In the embodiment depicted in FIG. 4, the end portions of the strap 36 can be provided with hooks 18A such that these hooks can be coupled with a preselected length of the chain connected to the respective end portions of the strap 36.

FIG. 2 depicts an alternate embodiment of a handle indicated at 16'. This handle 16' includes a handle member 44 having first and further end portions. This handle member has a length which is suitable for being gripped by one hand and/or two closely positioned hands. A hook support section 46 connects the first and further end portions of the handle member and comprises in the preferred embodiment a flexible strap or U-shaped metal strip joined at its opposite end portions to the opposite end portions of the handle member 44. A hook 18B is carried by the hook support section of the handle 16' for being connected with the means for joining the handle and the roll engaging member at a selected location for adjusting the effective distance between the handle and the roll.

An alternate embodiment of the roll engaging member is depicted at 20'' in FIG. 3. In this embodiment, the roll engaging member comprises an elongated tube 48 which is hollow therethrough and defines an interior surface. This tube has a first end portion 50 and a further end portion 52. The first end portion 50 of the tube 48 is proportioned for being received within the tube 14 about which the carpet is rolled. The means for frictionally engaging the cylindrical tube generally indicated at 26' comprises an elongated arm 54 which is pivotally connected at the location 56 which is spaced from its first end portion 58 and its further end portion 60. The first end portion 50 of the tube 48 defines an opening 62 through which the first end portion 58 and its frictionally engaging protrusions 64 carried thereby extend as the first end portion of the arm is pivoted downwardly such that the protrusions engage the interior surface of the cylindrical tube forming the core of the carpet roll. The chain link 30C is connected to end portion 60 of the arm 54 by a direct connection of a chain link thereto or to suitable means such as a hook 18B mounted on end portion 60 (see FIG. 3A). This end portion 60 extends beyond the end portion 52 of the tube 48 or a suitable opening 66 can be provided in the tube for purposes of receiving the chain therethrough. Thus, as the handle 16' is pulled upwardly, the protrusions 64 are forced into frictional engagement with the interior surface of the cylindrical tube thereby assisting in preventing the roll engaging member from slipping therefrom during movement of the roll.

Figure 5:
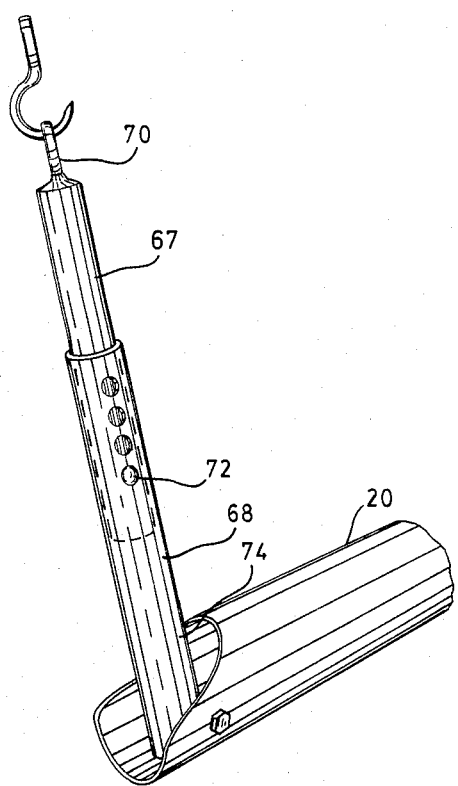
FIG. 5 illustrates an alternate means for adjusting the distance between the handle and the roll of sheet material while it is being carried.

Another embodiment of means for adjusting the distance between the handle and the carpet rolls is depicted in FIG. 5. In this embodiment, a pair of telescoping rods 67 and 68 serve as the means for joining the handle and the roll engaging member. In the embodiment depicted in FIG. 5 the rod 67 carries an eyelet 70 which can be coupled with the hook on the handle 16. The effective length of the rods can be adjusted by pressing the compressible pin 72, sliding the rods to the desired length until the pin registers with the suitable opening in the rod 68, at which point it will be released through this opening for securing the respective positions of the rods 67 and 68. The end portion 74 of the rod 68 is pivotally connected to the end portion of the roll engaging member 20.

While a preferred embodiment has been shown and described, it will be understood that there is no intent to limit the invention by such disclosure, but rather it is intended to cover all modifications and alternate constructions falling within the spirit and scope of the invention as defined in the appended claims.

I claim:

1. An apparatus for assisting a worker in moving a roll of sheet goods such as a roll of carpet having opposite end portions, such sheet goods being rolled upon a centrally disposed cylindrical tube defining an interior surface and which forms the core of the sheet goods roll, said tube having opposite end portions, which comprises:

a handle, a cylindrical roll engaging member having a first end portion and a further end portion and being proportioned for being received within an end portion of such tube, said roll engaging member including means at said further end portion for frictionally engaging such interior surface to prevent said roll engaging member from inadvertently disengaging from said roll during moving operations, and means for joining said handle and said first end of said roll engaging member, said means for joining said handle and said roll engaging member having an adjustable length such that such worker can position said handle at a preselected distance from said roll engaging member thereby enhancing the comfort and ease of movement of such worker during such moving operation while said roll engaging member is frictionally engaged with such interior surface of such tube.

2. The apparatus for moving a roll of sheet material such as a carpet roll of claim 1 wherein said handle comprises a T-bar handle member having opposite end portions proportioned for being gripped by such worker, said T-bar handle member further defining a mid-portion, and wherein said means for joining the handle and the roll engaging member comprises a length of chain having one end portion connected to said first end portion of said roll engaging member and a further end portion, and a hook carried by said mid-portion of said handle member, said further end portion of said chain including links proportioned for being connected to said hook carried by said T-bar handle member.

3. The apparatus for moving rolls of claim 1 wherein said handle comprises a handle member having first and further end portions, and having a length suitable for being gripped by one hand and/or two closely positioned hands and a hook support section connecting said first and further end portions of said handle member, and wherein said means for joining the handle and roll engaging member comprises a length of chain having a first end portion connected to said first end portion of said roll engaging member and a further end portion, and a hook carried by said hook support section of said handle, and wherein said length of chain includes chain links proportioned for being coupled with said hook carried by said handle.

4. The apparatus of claim 1 for moving rolls wherein said means for joining said handle and said roll engaging member comprises a pair of axially-aligned telescoping rods having an adjustable combined length, and means for securing said rods to each other after the combined length is 5. An apparatus for moving a roll of sheet material such as carpet having opposite end portions, such as a carpet roll being rolled upon a centrally disposed cylindrical tube defining an interior surface and which forms the core of the carpet roll, said tube having opposite end portions, said apparatus comprising:

a handle, a roll engaging member having a first end portion and a further end portion, said roll engaging member being proportioned for being received within the end portion of said cylindrical tube forming the core of said carpet roll, said roll engaging member including means for frictionally engaging said cylindrical tube to prevent said roll engaging member from inadvertently disengaging said cylindrical tubes during moving operations, said means for frictionally engaging said cylindrical tubes comprising an elongated arm having a first end portion carrying at least one protruding member, and a further end portion, said elongated arm being pivotally connected at a location spaced from its end portion to the interior surface of said roll engaging member, and wherein said first end portion of said roll engaging member defines an opening through which said first end portion of said elongated arm and its protrusion can extend as said first end portion of said arm is pivoted downwardly such that said protrusion engages the interior surface of said cylindrical tube forming the core of said carpet roll, and means for joining the handle and said roll engaging member, said means for joining the handle and the roll engaging member having an adjustable length such that the carpet roll mover can position the handle at a preselected distance from said roll thereby enhancing the carpet mover's comfort and ease of movement during the moving operation, said means for joining the handle and roll engaging member comprising a length of chain having a first end portion connected to said handle and a further end portion connected to said further end portion of said elongated arm, such that as said handle is pulled upwardly said protrusion is forced into frictional engagement with said interior of said cylindrical tube forming the core of said carpet roll.

6. An apparatus for aiding in lifting and moving a roll of sheet goods, such as a roll of carpet, to minimize back strain on an installer, such sheet goods being rolled upon a cylindrical tube having opposite end portions and an axial bore with an interior surface joining such end portions, such tube forming a core of such roll of sheet goods, which comprises:

a roll engaging member for insertion within such bore of such tube at such end portion, said roll engaging having a cylindrical tubular body proportioned to be received within such bore and having a first and further end, said first end of said body being provided with at least one substantially radial protrusion to frictionally engage such interior surface of such bore when lifting motion is applied to said further end of said body;

an adjustable length member having first and further ends, said first end pivotally attached to said first end of said roll engaging member, said adjustable length member having a pair of axially aligned telescoping rods and means for releasable attachment of said rods to each other for selecting the effective length of said adjustable length member; and a handle attached to said further end of said adjustable length member, said handle adapted to be grasped by such installer whereby said roll of sheet goods can be safely lifted with said protrusion engaging such bore of such tube with said adjustable length member selectively adjusted in length to minimize back strain to such installer.

* * * * *